US009493897B2

(12) United States Patent
Borlin et al.

(10) Patent No.: US 9,493,897 B2
(45) Date of Patent: Nov. 15, 2016

(54) METHOD OF OPERATION FOR A LAUNDRY TREATING APPLIANCE HAVING A BALL BALANCE RING

(71) Applicant: Whirlpool Corporation, Benton Harbor, MI (US)

(72) Inventors: Christopher L. Borlin, Stevensville, MI (US); Christopher H. Matulis, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 619 days.

(21) Appl. No.: 13/925,877

(22) Filed: Jun. 25, 2013

(65) Prior Publication Data
US 2014/0379142 A1  Dec. 25, 2014

(51) Int. Cl.
*D06F 37/24* (2006.01)
*G05D 19/02* (2006.01)
*D06F 35/00* (2006.01)
*D06F 37/20* (2006.01)
*D06F 37/22* (2006.01)

(52) U.S. Cl.
CPC .......... *D06F 37/245* (2013.01); *D06F 35/007* (2013.01); *D06F 37/203* (2013.01); *D06F 37/225* (2013.01); *G05D 19/02* (2013.01); *D06F 2202/10* (2013.01); *D06F 2204/06* (2013.01); *D06F 2222/00* (2013.01)

(58) Field of Classification Search
None
See application file for complete search history.

(56) References Cited

U.S. PATENT DOCUMENTS 7,761,187 B2 *  7/2010  Ko ........................ D06F 37/225
                                                        68/12.06

2006/0075578 A1 *  4/2006  Hellhake ............... D06F 37/203
                                                          8/158
2008/0041116 A1 *  2/2008  Kanazawa .............. G01M 1/36
                                                          68/23.2
2008/0104769 A1 *  5/2008  Ryu ...................... D06F 35/007
                                                          8/159
2008/0105002 A1 *  5/2008  Ko ........................ D06F 35/007
                                                          68/12.06
2008/0172804 A1 *  7/2008  Vanhazebrouck ...... D06F 39/08
                                                          8/158
2008/0172805 A1 *  7/2008  Na ........................ D06F 35/007
                                                          8/159

(Continued)

FOREIGN PATENT DOCUMENTS

DE    19842610 A1    7/1999
EP     0810316 A1    3/1997

(Continued)

OTHER PUBLICATIONS

European Search Report for Corresponding EP14173193.5, Dec. 5, 2014.

*Primary Examiner* — Robert Fennema
*Assistant Examiner* — Jay Jung

(57) ABSTRACT

A method operating a laundry treating appliance having a rotatable drum at least partially defining a treating chamber for receiving a laundry load for treatment according to an automatic cycle of operation and a ball balance ring mounted to the rotatable drum and defining an internal raceway in which a plurality of balls are located, where the method includes rotating the drum at or above a satellizing speed, determining positions of the plurality of balls, and accelerating the rotational speed of the drum based on the determined positions of the plurality of balls.

20 Claims, 6 Drawing Sheets

(56) References Cited

U.S. PATENT DOCUMENTS

| | | | | |
|---|---|---|---|---|
| 2009/0288260 A1* | 11/2009 | Jurmann | ............... | D06F 37/203 8/159 |
| 2009/0308110 A1* | 12/2009 | Koo | ...................... | D06F 37/225 68/23.2 |
| 2011/0023554 A1* | 2/2011 | Clark | ...................... | D06F 37/22 68/12.06 |
| 2012/0006069 A1* | 1/2012 | Kim | ........................ | D06F 37/04 68/140 |
| 2012/0246835 A1* | 10/2012 | Ashrafzadeh | ......... | D06F 37/203 8/137 |
| 2014/0090181 A1* | 4/2014 | Janke | ...................... | D06F 33/02 8/137 |

FOREIGN PATENT DOCUMENTS

| | | |
|---|---|---|
| EP | 0810389 A1 | 3/1997 |
| EP | 0878575 A1 | 11/1998 |
| EP | 1096050 A2 | 5/2001 |

* cited by examiner

METHOD OF OPERATION FOR A LAUNDRY TREATING APPLIANCE HAVING A BALL BALANCE RING

BACKGROUND

Laundry treating appliances, such as clothes washers, refreshers, and non-aqueous systems, may have a configuration based on a rotating drum that defines a treating chamber in which laundry items are placed for treating according to one or more cycles of operation. The laundry treating appliance may have a controller that implements the cycles of operation having one or more operating parameters. The controller may control a motor to rotate the drum according to one of the cycles of operation, during such rotation the laundry may not distribute equally about the inner surface of the drum leading to an imbalance. If a sufficiently large enough load imbalance is present, the laundry treating appliance may experience undesirable vibrations and movements when the drum is rotated at spin speeds.

BRIEF SUMMARY

In one embodiment, the invention relates to a method operating a laundry treating appliance having a rotatable drum at least partially defining a treating chamber for receiving a laundry load for treatment according to an automatic cycle of operation and a ball balance ring mounted to the rotatable drum and defining an internal raceway in which a plurality of balls are located, including rotating the drum at or above a satellizing speed, determining when the plurality of balls are angularly aligned with an imbalance of laundry in the drum during the rotation of the drum, determining when in the future the plurality of balls will be angularly opposite the imbalance of laundry in the rotatable drum based on the determination of angular alignment of the plurality of balls and the imbalance, and accelerating the rotational speed of the drum through a natural frequency of the washing machine when the plurality of balls are determined to be angularly opposite the imbalance of laundry in the rotatable drum.

DESCRIPTION OF EMBODIMENTS OF THE INVENTION

Figure 1:
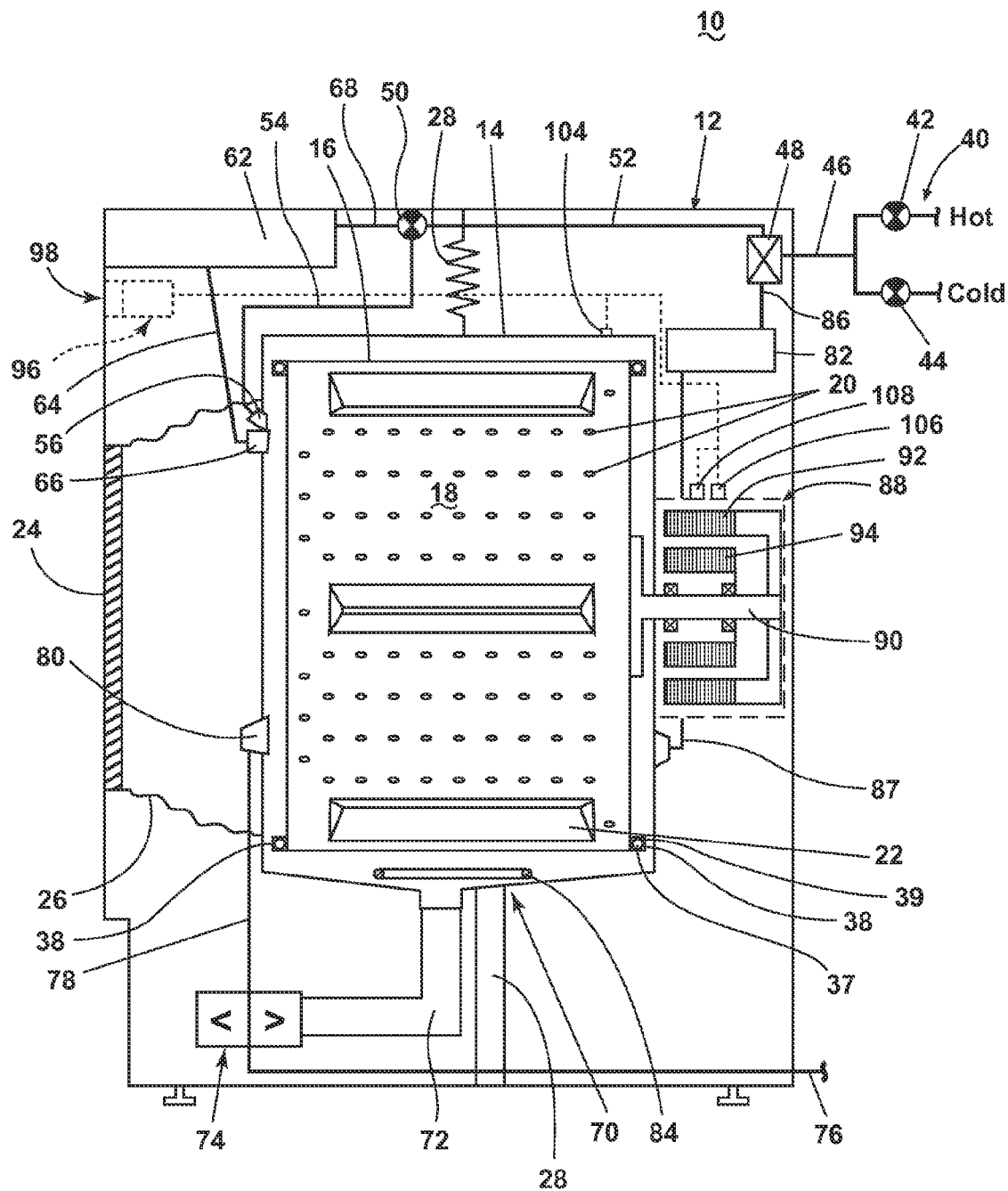
FIG. 1 is a schematic view of a laundry treating appliance in the form of a washing machine according to a first embodiment of the invention.

FIG. 1 is a schematic view of a laundry treating appliance according to a first embodiment of the invention. The laundry treating appliance may be any appliance which performs a cycle of operation to clean or otherwise treat items placed therein, non-limiting examples of which include a horizontal or vertical axis clothes washer; a combination washing machine and dryer; a dispensing dryer; a tumbling or stationary refreshing/revitalizing machine; an extractor; a non-aqueous washing apparatus; and a revitalizing machine.

As used herein, the term "vertical-axis" washing machine refers to a washing machine having a rotatable drum that rotates about a generally vertical axis relative to a surface that supports the washing machine. However, the rotational axis need not be perfectly vertical to the surface. The drum may rotate about an axis inclined relative to the vertical axis, with fifteen degrees of inclination being one example of the inclination. Similar to the vertical axis washing machine, the term "horizontal-axis" washing machine refers to a washing machine having a rotatable drum that rotates about a generally horizontal axis relative to a surface that supports the washing machine. The drum may rotate about the axis inclined relative to the horizontal axis, with fifteen degrees of inclination being one example of the inclination.

The laundry treating appliance of FIG. 1 is illustrated as a horizontal-axis washing machine 10, which may include a structural support system comprising a cabinet 12 which defines a housing within which a laundry holding system resides. The cabinet 12 may be a housing having a chassis and/or a frame, defining an interior enclosing components typically found in a conventional washing machine, such as motors, pumps, fluid lines, controls, sensors, transducers, and the like. Such components will not be described further herein except as necessary for a complete understanding of the invention.

The laundry holding system includes a tub 14 supported within the cabinet 12 by a suitable suspension system and a drum 16 provided within the tub 14, the drum 16 defining at least a portion of a laundry treating chamber 18 for receiving a laundry load for treatment. The drum 16 may include a plurality of perforations 20 such that liquid may flow between the tub 14 and the drum 16 through the perforations 20. A plurality of baffles 22 may be disposed on an inner surface of the drum 16 to lift the laundry load received in the treating chamber 18 while the drum 16 rotates. It is also within the scope of the invention for the laundry holding system to include only a tub with the tub defining the laundry treating chamber.

The laundry holding system may further include a door 24 which may be movably mounted to the cabinet 12 to selectively close both the tub 14 and the drum 16. A bellows 26 may couple an open face of the tub 14 with the cabinet 12, with the door 24 sealing against the bellows 26 when the door 24 closes the tub 14.

The washing machine 10 may further include a suspension system 28 for dynamically suspending the laundry holding system within the structural support system.

The washing machine 10 may also include at least one balance ring 38 containing a balancing material moveable within the balance ring 38 to counterbalance an imbalance that may be caused by laundry in the treating chamber 18 during rotation of the drum 16. More specifically, the balance ring 38 may be coupled with the rotating drum 16 and configured to compensate for a dynamic imbalance during rotation of the rotatable drum 16. The balancing material may be in the form of balls, cylinders, plates, fluid, or a combination thereof. In the illustrated example, the balance ring 38 defines an internal raceway in which a plurality of balls 37 and fluid 39 are located. The balance ring 38 may extend circumferentially around a periphery of the drum 16 and may be located at any desired location along an axis of rotation of the drum 16. When multiple balance rings 38 are present, they may be equally spaced along the axis of rotation of the drum 16. For example, in the illustrated example a plurality of balance rings 38 are included in the washing machine 10 and the plurality of balance rings 38 are operably coupled with opposite ends of the rotatable drum 16.

The washing machine 10 may further include a liquid supply system for supplying water to the washing machine 10 for use in treating laundry during a cycle of operation. The liquid supply system may include a source of water, such as a household water supply 40, which may include separate valves 42 and 44 for controlling the flow of hot and cold water, respectively. Water may be supplied through an inlet conduit 46 directly to the tub 14 by controlling first and second diverter mechanisms 48 and 50, respectively. The diverter mechanisms 48, 50 may be a diverter valve having two outlets such that the diverter mechanisms 48, 50 may selectively direct a flow of liquid to one or both of two flow paths. Water from the household water supply 40 may flow through the inlet conduit 46 to the first diverter mechanism 48 which may direct the flow of liquid to a supply conduit 52. The second diverter mechanism 50 on the supply conduit 52 may direct the flow of liquid to a tub outlet conduit 54 which may be provided with a spray nozzle 56 configured to spray the flow of liquid into the tub 14. In this manner, water from the household water supply 40 may be supplied directly to the tub 14.

The washing machine 10 may also be provided with a dispensing system for dispensing treating chemistry to the treating chamber 18 for use in treating the laundry according to a cycle of operation. The dispensing system may include a dispenser 62 which may be a single use dispenser, a bulk dispenser or a combination of a single use and bulk dispenser.

Regardless of the type of dispenser used, the dispenser 62 may be configured to dispense a treating chemistry directly to the tub 14 or mixed with water from the liquid supply system through a dispensing outlet conduit 64. The dispensing outlet conduit 64 may include a dispensing nozzle 66 configured to dispense the treating chemistry into the tub 14 in a desired pattern and under a desired amount of pressure. For example, the dispensing nozzle 66 may be configured to dispense a flow or stream of treating chemistry into the tub 14 by gravity, i.e. a non-pressurized stream. Water may be supplied to the dispenser 62 from the supply conduit 52 by directing the diverter mechanism 50 to direct the flow of water to a dispensing supply conduit 68.

Non-limiting examples of treating chemistries that may be dispensed by the dispensing system during a cycle of operation include one or more of the following: water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof.

The washing machine 10 may also include a recirculation and drain system for recirculating liquid within the laundry holding system and draining liquid from the washing machine 10. Liquid supplied to the tub 14 through tub outlet conduit 54 and/or the dispensing supply conduit 68 typically enters a space between the tub 14 and the drum 16 and may flow by gravity to a sump 70 formed in part by a lower portion of the tub 14. The sump 70 may also be formed by a sump conduit 72 that may fluidly couple the lower portion of the tub 14 to a pump 74. The pump 74 may direct liquid to a drain conduit 76, which may drain the liquid from the washing machine 10, or to a recirculation conduit 78, which may terminate at a recirculation inlet 80. The recirculation inlet 80 may direct the liquid from the recirculation conduit 78 into the drum 16. The recirculation inlet 80 may introduce the liquid into the drum 16 in any suitable manner, such as by spraying, dripping, or providing a steady flow of liquid. In this manner, liquid provided to the tub 14, with or without treating chemistry may be recirculated into the treating chamber 18 for treating the laundry within.

The liquid supply and/or recirculation and drain system may be provided with a heating system which may include one or more devices for heating laundry and/or liquid supplied to the tub 14, such as a steam generator 82 and/or a sump heater 84. Liquid from the household water supply 40 may be provided to the steam generator 82 through the inlet conduit 46 by controlling the first diverter mechanism 48 to direct the flow of liquid to a steam supply conduit 86. Steam generated by the steam generator 82 may be supplied to the tub 14 through a steam outlet conduit 87. The steam generator 82 may be any suitable type of steam generator such as a flow through steam generator or a tank-type steam generator. Alternatively, the sump heater 84 may be used to generate steam in place of or in addition to the steam generator 82. In addition or alternatively to generating steam, the steam generator 82 and/or sump heater 84 may be used to heat the laundry and/or liquid within the tub 14 as part of a cycle of operation.

Additionally, the liquid supply and recirculation and drain system may differ from the configuration shown in FIG. 1, such as by inclusion of other valves, conduits, treating chemistry dispensers, sensors, such as water level sensors and temperature sensors, and the like, to control the flow of liquid through the washing machine 10 and for the introduction of more than one type of treating chemistry.

The washing machine 10 also includes a drive system for rotating the drum 16 within the tub 14. The drive system may include a motor 88 for rotationally driving the drum 16. The motor 88 may be directly coupled with the drum 16 through a drive shaft 90 to rotate the drum 16 about a rotational axis during a cycle of operation. The motor 88 may be a brushless permanent magnet (BPM) motor having a stator 92 and a rotor 94. Alternately, the motor 88 may be coupled with the drum 16 through a belt and a drive shaft to rotate the drum 16, as is known in the art. Other motors, such as an induction motor or a permanent split capacitor (PSC) motor, may also be used. The motor 88 may rotationally drive the drum 16 including that the motor 88 may rotate the drum 16 at various speeds in either rotational direction.

The washing machine 10 also includes a control system for controlling the operation of the washing machine 10 to implement one or more cycles of operation. The control system may include a controller 96 located within the cabinet 12 and a user interface 98 that is operably coupled with the controller 96. The user interface 98 may include one or more knobs, dials, switches, displays, touch screens and the like for communicating with the user, such as to receive input and provide output. The user may enter different types of information including, without limitation, cycle selection and cycle parameters, such as cycle options.

The controller 96 may include the machine controller and any additional controllers provided for controlling any of the components of the washing machine 10. For example, the controller 96 may include the machine controller and a motor controller. Many known types of controllers may be used for the controller 96. The specific type of controller is not germane to the invention. It is contemplated that the controller is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), may be used to control the various components.

Figure 2:
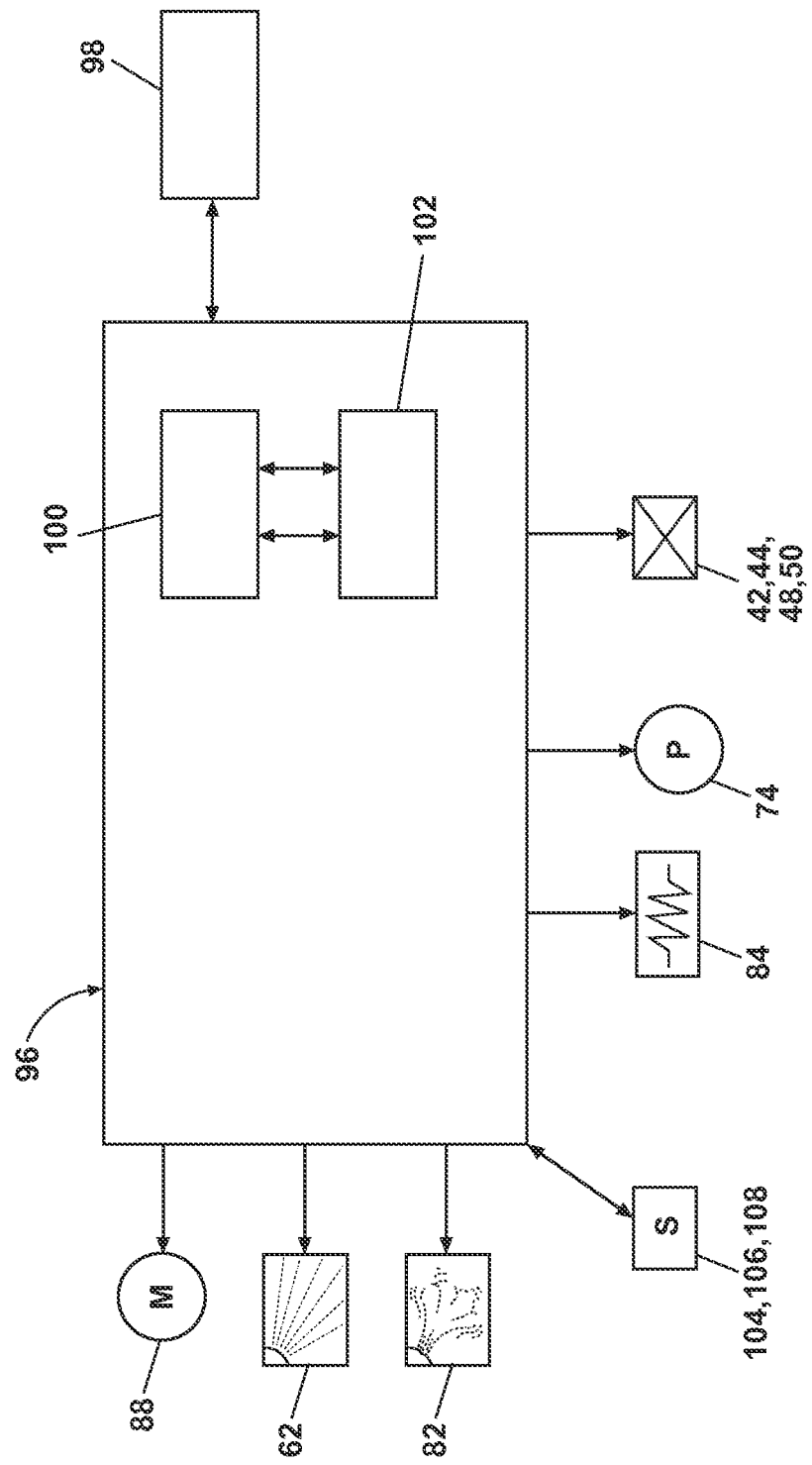
FIG. 2 is a schematic of a control system of the laundry treating appliance of FIG. 1 according to the first embodiment of the invention.

As illustrated in FIG. 2, the controller 96 may be provided with a memory 100 and a central processing unit (CPU) 102. The memory 100 may be used for storing the control software that may be executed by the CPU 102 in completing a cycle of operation using the washing machine 10 and any additional software. Examples, without limitation, of cycles of operation include: wash, heavy duty wash, delicate wash, quick wash, pre-wash, refresh, rinse only, and timed wash. The memory 100 may also be used to store information, such as a database or table, and to store data received from one or more components of the washing machine 10 that may be communicably coupled with the controller 96. The database or table may be used to store the various operating parameters for the one or more cycles of operation, including factory default values for the operating parameters and any adjustments to them by the control system or by user input.

The controller 96 may be operably coupled with one or more components of the washing machine 10 for communicating with and controlling the operation of the component to complete a cycle of operation. For example, the controller 96 may be operably coupled with the motor 88, the pump 74, the dispenser 62, the steam generator 82 and the sump heater 84 to control the operation of these and other components to implement one or more of the cycles of operation.

The controller 96 may also be coupled with one or more sensors 104 provided in one or more of the systems of the washing machine 10 to receive input from the sensors, which are known in the art and not shown for simplicity. Non-limiting examples of sensors 104 that may be communicably coupled with the controller 96 include: a treating chamber temperature sensor, a moisture sensor, a weight sensor, a chemical sensor, a position sensor, an acceleration sensor, an orientation sensor, an imbalance sensor, a load size sensor, and a motor torque sensor, which may be used to determine a variety of system and laundry characteristics, such as laundry load inertia or mass and system imbalance magnitude and position.

In one example, a motor sensor such as a motor torque sensor 106 may also be included in the washing machine 10 and may provide a torque output indicative of the torque applied by the motor 88. The motor torque is a function of the inertia of the rotating drum 16 and the laundry load. The motor torque sensor 106 may also include a motor controller or similar data output on the motor 88 that provides data communication with the motor 88 and outputs motor characteristic information, generally in the form of an analog or digital signal, to the controller 96 that is indicative of the applied torque. The controller 96 may use the motor characteristic information to determine the torque applied by the motor 88 using software that may be stored in the controller memory 100. Specifically, the motor torque sensor 106 may be any suitable sensor, such as a voltage or current sensor, for outputting a current or voltage signal indicative of the current or voltage supplied to the motor 88 to determine the torque applied by the motor 88. Additionally, the motor torque sensor 106 may be a physical sensor or may be integrated with the motor and combined with the capability of the controller 96, or may function as a sensor. For example, motor characteristics, such as speed, current, voltage, torque etc., may be processed such that the data provides information in the same manner as a separate physical sensor. In contemporary motors, the motors often have their own controller that outputs data for such information.

As another example, a speed sensor 108 may also be included in the washing machine 10 and may be positioned in any suitable location for detecting and providing a speed output indicative of a rotational speed of the drum 16. Such a speed sensor 108 may be any suitable speed sensor capable of providing an output indicative of the speed of the drum 16. It is also contemplated that the rotational speed of the drum 16 may also be determined based on a motor speed; thus, the speed sensor 108 may include a motor speed sensor for determining a speed output indicative of the rotational speed of the motor 88. The motor speed sensor may be a separate component, or may be integrated directly into the motor 88. Regardless of the type of speed sensor employed, or the coupling of the drum 16 with the motor 88, the speed sensor 108 may be adapted to enable the controller 96 to determine the rotational speed of the drum 16 from the rotational speed of the motor 88.

Prior to describing a method of operation of the washing machine 10, a brief summary of the underlying physical phenomena may be useful to aid in the overall understanding. The motor 88 may rotate the drum 16 at various speeds in either rotational direction. In particular, the motor 88 may rotate the drum 16 at speeds to effect various types of laundry load 112 movement inside the drum 16. For example, the laundry load may undergo at least one of tumbling, rolling (also called balling), sliding, satellizing (also called plastering), and combinations thereof. During tumbling, the drum 16 is rotated at a tumbling speed such that the fabric items in the drum 16 rotate with the drum 16 from a lowest location of the drum 16 towards a highest location of the drum 16, but fall back to the lowest location before reaching the highest location. Typically, the centrifugal force applied by the drum to the fabric items at the tumbling speeds is less than about 1 G. During satellizing, the motor 88 may rotate the drum 16 at rotational speeds, i.e. a spin speed, wherein the fabric items are held against the inner surface of the drum and rotate with the drum 16 without falling. This is known as the laundry being satellized or plastered against the drum. Typically, the force applied to the fabric items at the satellizing speeds is greater than or about equal to 1 G. For a horizontal axis washing machine 10, the drum 16 may rotate about an axis that is inclined relative to the horizontal, in which case the term "1 G" refers to the vertical component of the centrifugal force vector, and the total magnitude along the centrifugal force vector would therefore be greater than 1 G. The terms tumbling, rolling, sliding and satellizing are terms of art that may be used to describe the motion of some or all of the fabric items forming the laundry load. However, not all of the fabric items forming the laundry load need exhibit the motion for the laundry load to be described accordingly. Further, the rotation of the fabric items with the drum 16 may be facilitated by the baffles 22.

Centrifugal force (CF) is a function of a mass (m) of an object (laundry item 116), an angular velocity (w) of the object, and a distance, or radius (r) at which the object is located with respect to an axis of rotation, or a drum axis. Specifically, the equation for the centrifugal force (CF) acting on a laundry item 116 within the drum 16 is:

$$CF = m * \omega^2 * r \tag{1}$$

The centrifugal force (CF) acting on any single item 116 in the laundry load 112 may be modeled by the distance the center of gravity of that item 116 is from the axis of rotation of the drum 16. Thus, when the laundry items 116 are stacked upon each other, which is often the case, those items having a center of gravity closer to the axis of rotation experience a smaller magnitude centrifugal force (CF) than those items having a center of gravity farther away. It is possible to slow the speed of rotation of the drum 16 such that the closer items 116 will experience a centrifugal force (CF) less than the force required to satellize them, permitting them to tumble, while the farther away items 116 still experience a centrifugal force (CF) equal to or greater than the force required to satellize them, retaining them in a fixed position relative to the drum 16. Using such a control of the speed of the drum 16, it is possible to control the speed of the drum 16 such that the closer items 116 may tumble within the drum 16 while the farther items 116 remain fixed. This method may be used to eliminate an imbalance 114 caused by a mass of stacked laundry items 116 because an imbalance is often caused by a localized "piling" of items 116.

As used in this description, the elimination of the imbalance 114 means that the imbalance 114 is reduced below a maximum magnitude suitable for the operating conditions. It does not require a complete removal of the imbalance 114. In many cases, the suspension system 28 in the washing machine 10 may accommodate a certain amount of imbalance 114. Thus, it is not necessary to completely remove the entire imbalance 114.

Figure 3:
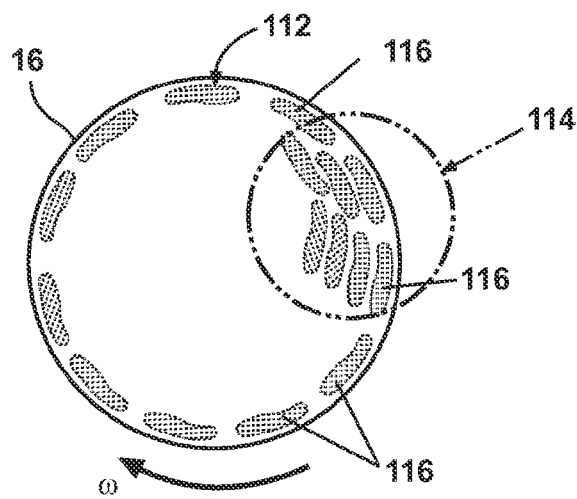
FIG. 3 schematically illustrates a laundry load, including an imbalance, in a drum of the laundry treating appliance of FIG. 1.
Figure 4:
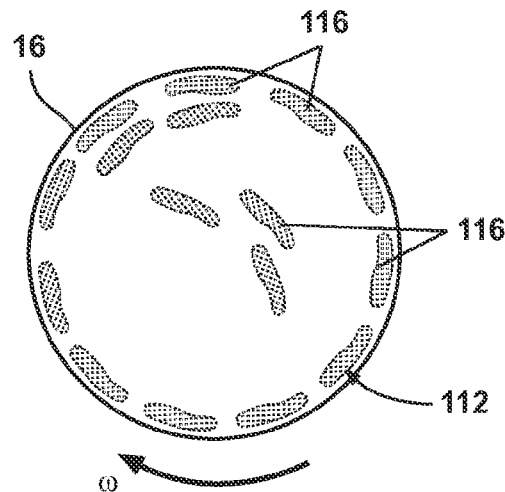
FIG. 4 schematically illustrates the position of the laundry load in the drum as it is redistributed.
Figure 5:
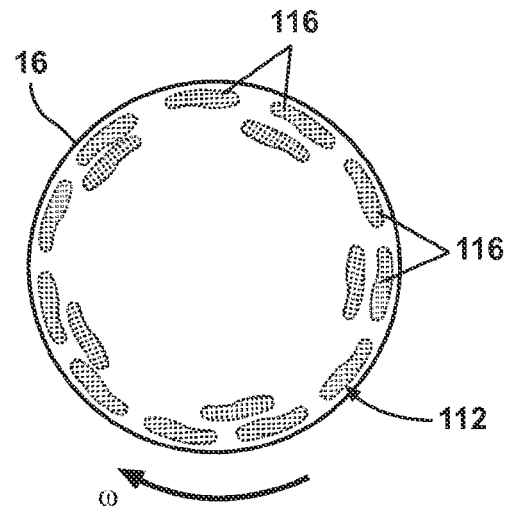
FIG. 5 schematically illustrates the position of the laundry load in the drum after the imbalance has been sufficiently eliminated.

FIGS. 3-5 graphically illustrate such a method. Beginning with FIG. 3, an unequally distributed laundry load 112 is shown in the treating chamber 18 defined by the drum 16 during a spin phase wherein the treating chamber 18 is rotated at a spin speed sufficient to apply a centrifugal force greater than that required to satellize the entire laundry load 112, thereby, satellizing the laundry load 112. However, it may also be seen that not all the laundry items 116 that make up the laundry load 112 are located an equal distance from the axis of rotation. Following the above equation, the centrifugal force (CF) acting on each laundry item 116 in the treating chamber 18 is proportional to the distance from the axis of rotation. Thus, along the radius of the treating chamber 18, the centrifugal force (CF) exhibited on the individual laundry items 116 will vary. Accordingly, the closer the laundry item 116 lies to the axis of rotation, the smaller the centrifugal force (CF) acting thereon. Therefore, to satellize all of the laundry items 116, the treating chamber 18 must be rotated at a spin speed sufficient that the centrifugal force (CF) acting on all of the laundry items 116 is greater than the gravity force acting thereon. It may be correlated that the laundry items 116 pressed against the inner peripheral wall of the treating chamber 18 experience greater centrifugal force (CF) than the laundry items 116 lying closer to the axis of rotation. In other words, during the spin phase and satellization of the laundry load 112, all of the laundry items 116 are experiencing centrifugal force greater than the force required to satellize them, yet not all of the laundry items 116 are experiencing the same centrifugal force (CF).

The imbalance 114 may be seen in the treating chamber 18, as circled in FIG. 3. The imbalance 114 is due to the uneven distribution of the laundry items 116 within the treating chamber 18. Further, the laundry items 116 that create the imbalance 114 will typically but not necessarily be those laundry items 116 that are closest to the axis of rotation. FIG. 4 illustrates the position of the laundry load 112 in the treating chamber 18 during a redistribution phase wherein the treating chamber 18 is slowed from the speed of FIG. 3 and rotated at a speed such that some of the laundry items 116 experience less than a centrifugal force required to satellize them, while the remaining laundry items 116 experience a centrifugal force required to satellize them or greater than a centrifugal force required to satellize them. According to the principals described above, as the rotational speed of the treating chamber 18 is reduced, the laundry item 116 or items that contributed to the imbalance 114 will begin to tumble and will be redistributed. Upon redistribution, the treating chamber 18 may be accelerated once again to a speed sufficient to satellize all of the laundry items 116. FIG. 5 illustrates the position where the imbalance 114 is eliminated by a sufficient redistribution and the rotational speed of the treating chamber 18 has been increased again to the spin speed sufficient to satellize the entire laundry load 112.

The deceleration of the drum 16 and acceleration of the drum 16 may include the controller 96 operating the motor 88 such that the speed of the drum 16 is dropped just below the satellizing speed and then brought back up to the satellizing speed such that the speed of the drum 16 oscillates around the satellizing speed, this is sometimes referred to as a short distribution. Alternatively, the deceleration of the drum 16 and acceleration of the drum 16 may include the controller 96 stopping the rotation of the drum 16 altogether and then bringing the drum 16 back up to the satellizing speed, this is sometimes referred to as a long distribution. Regardless of the type of distribution, an accurate satellizing speed is beneficial for the controller 96 to have and use. If the determined satellizing speed is lower than the actual satellizing speed, the controller 96 may attempt to satellize the laundry items and the laundry items may instead tumble. If the determined satellizing speed is higher than the actual satellizing speed, the controller 96 may attempt to redistribute the laundry by tumbling some of the laundry items and the laundry items may instead remain plastered to the drum 16.

Figure 6:
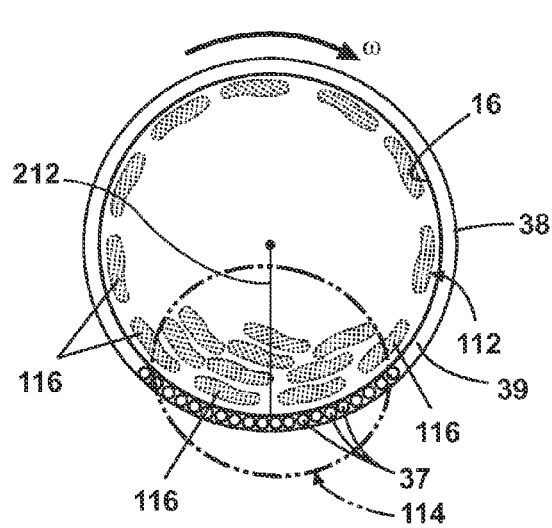
FIG. 6 schematically illustrates an imbalance angularly aligned with a plurality of balls in a balance ring of the laundry treating appliance of FIG. 1.

FIG. 6 illustrates the plurality of balls 37 being angularly aligned with an imbalance 114 in the drum 16. The alignment may be determined when the center of gravity of the plurality of balls 37 and the center of gravity of the imbalance 114 are aligned relative to a radius line 212 extending from the axis of rotation of the drum 16. Such alignment represents the greatest imbalance the laundry treating appliance must overcome.

Figure 8:
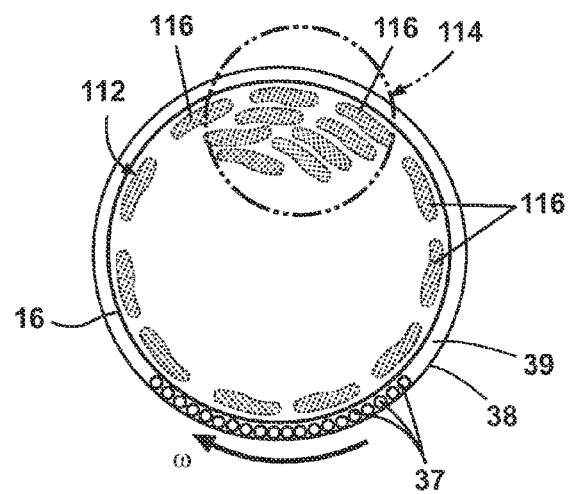
FIG. 8 schematically illustrates an imbalance angularly opposite the plurality of balls in the balance ring of the laundry treating appliance of FIG. 1.
Figure 7:
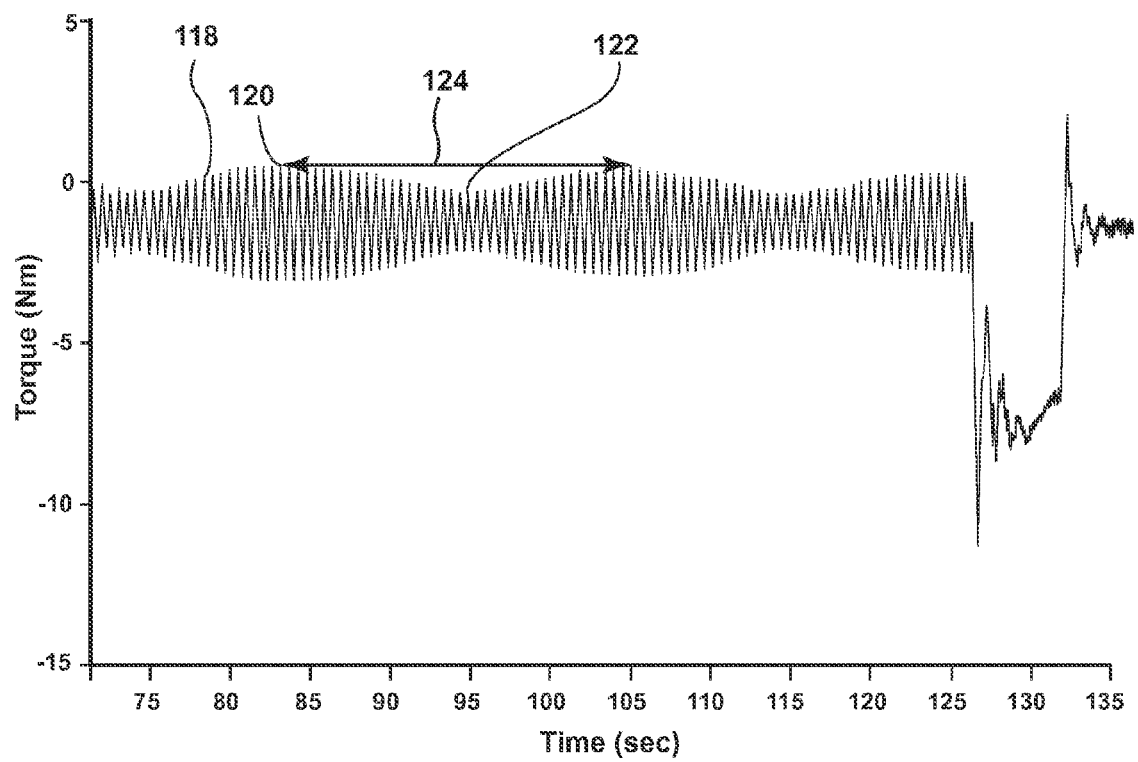
FIG. 7 is a graph illustrating torque values during operation of the laundry treating appliance.

It has been determined that a peak torque value correlates to the plurality of balls 37 in the balance ring 38 and the imbalance 114 being in the same angular position. More specifically, FIG. 7 illustrates a torque signal 118 that illustrates a peak torque value 120 that correlates to when the plurality of balls 37 are angularly aligned with an imbalance 114. A trough torque value 122 is illustrated and correlates with when the plurality of balls 37 are opposite the imbalance 114 as shown in FIG. 8.

Figure 9:
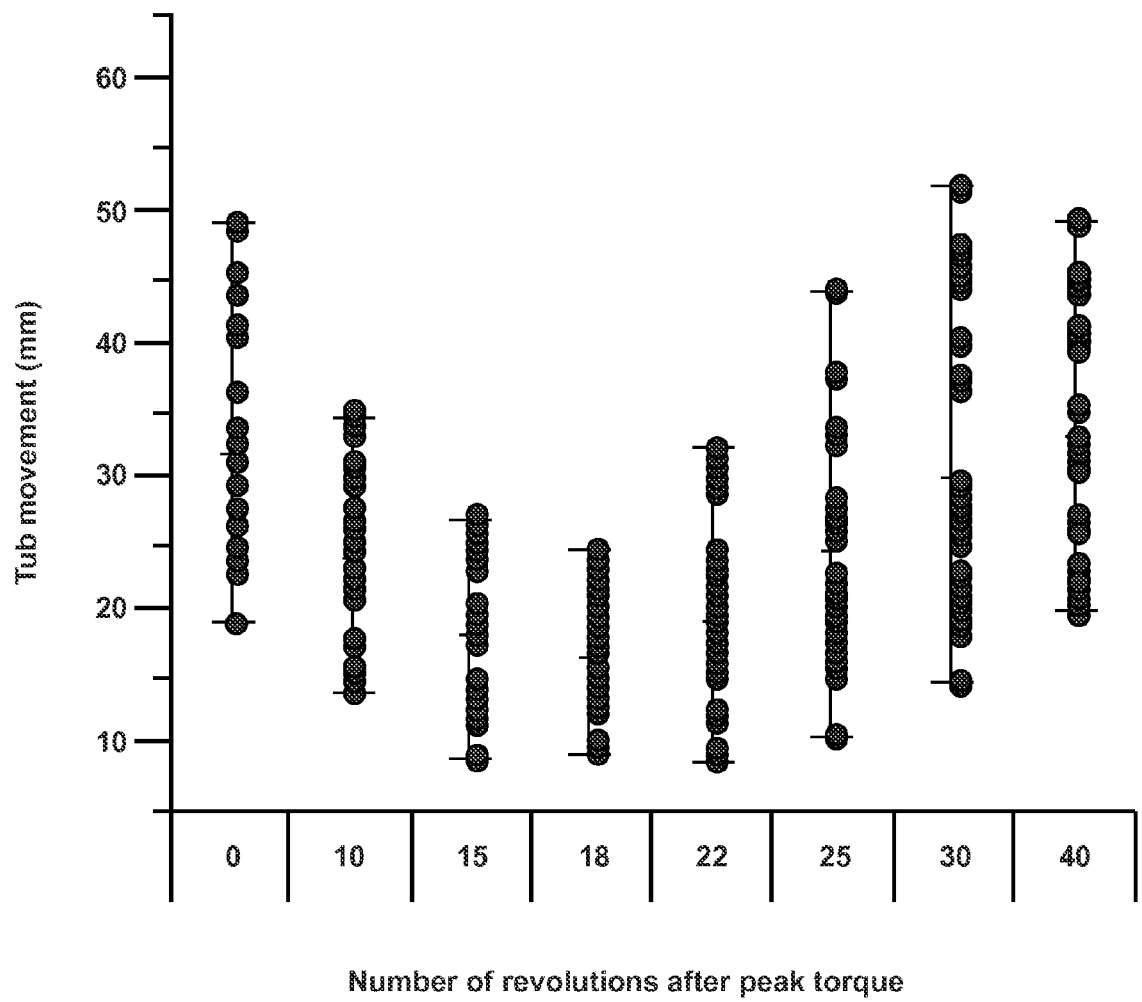
FIG. 9 is a chart showing how the number of revolutions after the peak torque has a large effect on the amount of tub movement.

It has been determined that the number of revolutions after determining the peak torque has a large effect on the movement of the tub 14. The point at which the plurality of balls 37 will be angularly opposite the imbalance 114 correlates to the least movement of the tub 14 and laundry appliance. FIG. 9 illustrates data regarding how the "n" number of revolutions after the peak torque signal has a large effect on the amount of tub movement. For example, in the chart it is illustrated that the least tub movement may correlate to 18 revolutions after the peak torque signal whereas immediately after and at thirty revolutions after the peak torque signal large movements of the tub occur. In the illustrated example, the tub movement is at a minimum at 18 revolutions after the peak torque signal, this is because the plurality of balls 37 is opposite the imbalance 114. The movement is greatest at immediately after the peak torque signal and at thirty revolutions after the peak torque signal, this is because the plurality of balls 37 is angularly aligned with an imbalance 114.

Figure 10:
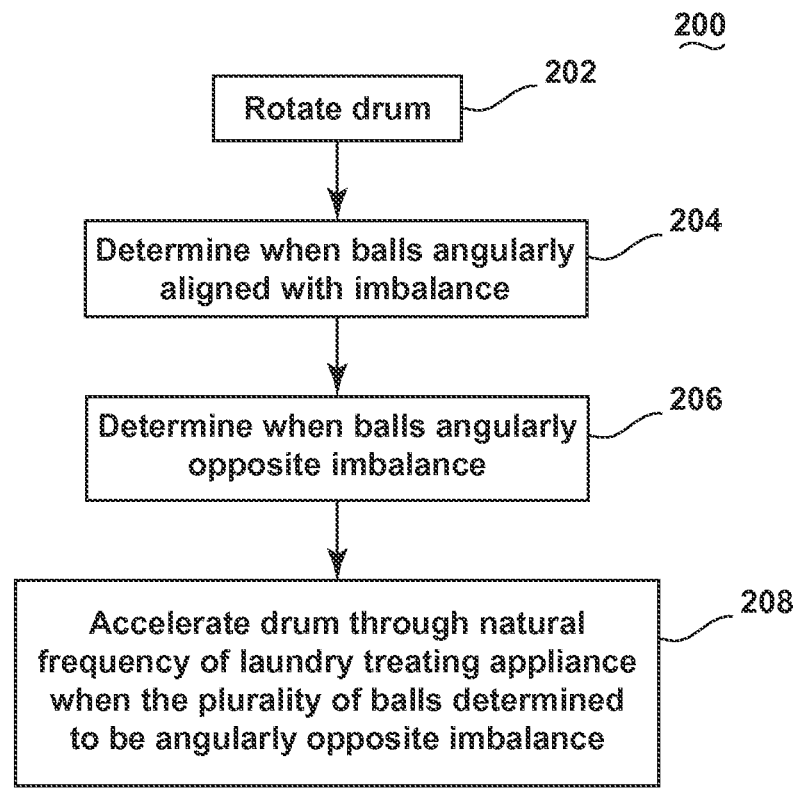
FIG. 10 is a flow chart illustrating a method of operating the washing machine according to an embodiment of the invention.

Referring now to FIG. 10, a flow chart of a method 200 for operating a laundry treating appliance, such as the washing machine 10, is illustrated. The sequence of steps depicted for this method is for illustrative purposes only, and is not meant to limit the method in any way as it is understood that the steps may proceed in a different logical order or additional or intervening steps may be included without detracting from the invention. The method 200 may be implemented in any suitable manner, such as automatically or manually, as a stand-alone phase or cycle of operation or as a phase of an operation cycle of the washing machine 10. The method 200 starts with assuming that the user has placed one or more laundry items 116 for treatment within the treating chamber 18 and selected a cycle of operation through the user interface 98.

At 202, the controller 96 may accelerate the drum 16 through operation of the motor 88 to rotate the drum 16 at or above a satellizing speed. This may include the drum 16 being rotated by the motor 88 from a non-satellizing speed to a satellizing speed. This may also include rotating the drum 16 through a satellizing speed for the laundry load and rotating the drum 16 above the satellizing speed for the laundry load. It is contemplated that the satellizing speed may be a predetermined speed or may be a speed at which the controller 96 determines the laundry may be satellized. For example, the controller 96 may determine the satellizing speed by determining a rotational speed of the drum 16 when a high frequency component of a torque signal of the motor 88 satisfies a reference value. By way of alternative example, the satellizing speed may be determined by determining a rotational speed of the drum 16 when the torque signal of motor 88 matches a reference torque signal.

While the drum 16 rotates at or above the satellizing speed, the controller 96 may determine when the plurality of balls 37 are angularly aligned with an imbalance 114 in the drum 16 during the rotation of the drum 16, as indicated at 204. It will be understood that determining when the plurality of balls 37 are angularly aligned with the imbalance 114 may include determining when the plurality of balls 37 are substantially aligned with the imbalance 114. Some misalignment between the plurality of balls 37 and the imbalance 114 may be acceptable and the plurality of balls will still be considered angularly aligned with the imbalance 114. Further, depending on the sampling rate, it may not be possible to determine when the plurality of balls 37 is perfectly angularly aligned.

Determining the angular alignment may be done in any suitable manner. For example, this may include determining a peak torque of the motor 88 rotating the drum 16. More specially, the controller 96 may receive one or more signals from the motor 88. From such motor signals, the controller 96 may determine a peak value of the motor torque. It has been determined that the balancing material moveable within the balance ring 38 affects the torque signal along with the imbalance 114. The torque signal is a function of the location of the plurality of balls 37 within the balance ring 38 as they move in and out of phase with the imbalance 114. As described above, the peak value correlates to the plurality of balls 37 in the balance ring 38 and the imbalance 114 being in the same angular position. It is contemplated that the controller 96 may receive a signal indicative of mechanical power and that the peak value of the motor torque may be determined from the mechanical power signal.

At 206, the controller 96 may determine when in the future the plurality of balls 37 will be angularly opposite the imbalance 114 in the rotatable drum 16 based on the determination of angular alignment of the plurality of balls 37 and the imbalance 114 at 204. It will be understood that determining when the plurality of balls 37 are angularly opposite the imbalance 114 may include determining when the plurality of balls 37 are substantially opposite the imbalance 114. Determining when the plurality of balls 37 will be angularly opposite the imbalance 114 (FIG. 8) in the rotatable drum 16 may include determining a number n of drum rotations until the plurality of balls 37 will be angularly opposite the imbalance 114 based on the peak torque. When the plurality of balls 37 will be angularly opposite the imbalance 114 correlates to when the rotational speed of the drum 16 should be accelerated through a natural frequency of the laundry treating appliance, which causes the laundry treating appliance to vibrate. It will be understood that the controller 96 may determine when in the future the plurality of balls 37 will be angularly opposite the imbalance 114 by estimating when in the future the plurality of balls 37 will be angularly opposite the imbalance 114. The plurality of balls 37 may be estimated to be angularly opposite the imbalance 114 when the center of mass of the plurality of balls 37 may be 180 degrees from the imbalance 114.

A variety of factors may change the speed at which the plurality of balls 37 will be angularly opposite the imbalance 114 in the rotatable drum 16 and the controller 96 may account for such factors during the determination at 206. For example, determining when the plurality of balls 37 will be angularly opposite the imbalance of laundry in the rotatable drum may be based on a viscosity of the fluid 39 in the balance ring 38. The controller 96 may determine the viscosity of the fluid 39 in the balance ring 38 based on a temperature of the fluid 39 in the balance ring 38. The temperature of the fluid 39 in the balance ring 38 may be estimated by the controller 96 based on a temperature within the drum 16 and the method may include sensing the temperature within the drum 16 such as through a sensor 104. The more viscous the fluid 39 the slower the plurality of balls 37 moves within the balance ring 38. In this manner the number n of drum rotations until the plurality of balls 37 will be angularly opposite the imbalance 114 may be adjusted based on the determined viscosity.

Furthermore, determining when the plurality of balls 37 will be angularly opposite the imbalance 114 in the rotatable drum 16 may be based on a movement of the laundry treating appliance. For example, in the above illustrated embodiment, the movement of the washing machine 10 may be a translational movement in at least one of the X, Y, and Z axes. Movement of the washing machine 10, such as the movement left to right of the washing machine 10, may be a function of the location of the plurality of balls 37 within the balance ring 38 as they move in and out of phase with the imbalance 114. It has been determined that the more movement there is in the laundry treating appliance the longer it will take for the plurality of balls 37 to be angularly opposite the imbalance 114. The controller 96 may determine the movement of the laundry treating appliance in any suitable manner including utilizing a sensor to determine a movement of the laundry treating appliance. Any suitable sensor may be utilized to determine the movement of the washing machine including a displacement sensor. The controller 96 may thus take the movement of the laundry treating appliance into account when determining the speed at which the plurality of balls 37 will be angularly opposite the imbalance 114 in the rotatable drum 16.

Furthermore, determining when the plurality of balls 37 will be angularly opposite the imbalance 114 in the rotatable drum 16 may be based on a size of the balance ring 38. The bigger the balance ring 38 the longer it takes the plurality of balls 37 to move around the balance ring 38. The controller 96 may thus take the size of the balance ring 38 into account when determining the speed at which the plurality of balls 37 will be angularly opposite the imbalance 114 in the rotatable drum 16.

Furthermore, determining when the plurality of balls 37 will be angularly opposite the imbalance 114 in the rotatable drum 16 may be based on a size of the imbalance 114. The controller 96 may determine the size of the imbalance 114 in any suitable manner and may take the size of the imbalance 114 into account when determining the speed at which the plurality of balls 37 will be angularly opposite the imbalance 114 in the rotatable drum 16. It has been determined that the larger the size of the imbalance 114 the longer it takes the plurality of balls 37 to move around the balance ring 38. By way of non-limiting example, the size of the imbalance 114 may be determined based on the torque signal including a magnitude of the average peak-to-peak value of the torque signal (FIG. 7 at 124), which may be proportional to the amount of imbalance. By way of further non-limiting example, determining the size of the imbalance may include determining a radius from a center of rotation of the drum 16 to a center of mass of the imbalance 114 as the length of the radius may be inversely proportional to the amount of imbalance 114. While the size of the imbalance 114 may be determined in either of these ways it will be understood that any method for determining the size of the imbalance 114 may be used as the method of determining is not germane to the invention.

Further still, determining when the plurality of balls 37 will be angularly opposite the imbalance 114 in the rotatable drum 16 may be based on a size of the distributed mass of laundry in the rotatable drum 16. The controller 96 may determine the size of the distributed mass of laundry in any suitable manner and may take the size into account when determining the speed at which the plurality of balls 37 will be angularly opposite the imbalance 114 in the rotatable drum 16. It has been determined that the larger the size of the distributed mass the quicker the plurality of balls 37 move around the balance ring 38.

By way of further example, determining when the plurality of balls 37 will be angularly opposite the imbalance 114 in the rotatable drum 16 may be based on an indicator of age of the laundry treating appliance. It will be understood that the age of the laundry treating appliance may be time-based age or a number of cycles of operation that laundry treating appliance has run. The controller 96 may determine the age or keep track of the age of the laundry treating appliance in any suitable manner and may take the age of the laundry treating appliance into account when determining the speed at which the plurality of balls 37 will be angularly opposite the imbalance 114 in the rotatable drum 16. It has been determined that the older the laundry treating appliance the longer it may take the plurality of balls 37 to move around the balance ring 38.

At 208, the rotational speed of the drum 16 may be accelerated through a natural frequency of the washing machine when the plurality of balls 37 may be determined to be angularly opposite the imbalance 114 in the rotatable drum 16 as this coincides with minimum movements of the laundry treating appliance. This may include that the controller 96 may select a ramp rate and may initiate the acceleration such that the drum speed may be about equal to the natural frequency of the laundry treating appliance when the plurality of balls 37 are predicted to be opposite the imbalance 114. Based on the ramp rate, this may include that the controller 96 begins to increase a speed of rotation of the drum 16 when the plurality of balls 37 may be at a determined phase angle from the laundry imbalance such as 150 degrees.

It will be understood that the method of operating the laundry treating appliance may be flexible and that the method 200 illustrated is merely for illustrative purposes. For example, it is contemplated that the controller 96 may take into account any of the above factors and may make any determinations necessary regarding such factors before determining when the plurality of balls 37 will be angularly opposite the imbalance 114 in the rotatable drum 16. Further, while portions of the method and description thus far have been specific to a washing machine it will be understood that embodiments of the invention may be utilized with any suitable laundry treating appliance. Further, as the natural frequencies of the laundry treating appliance may not be located at the same revolutions per minute of the drum, i.e. the horizontal and vertical natural frequencies are at different speeds, it may be beneficial to repeat the method so that the first natural frequency may be passed then the controller may stop accelerating the drum and allow the plurality of balls 37 to position themselves opposite the imbalance before accelerating past the next natural frequency.

The above described embodiments provided a variety of benefits including that the cycle of operation of the laundry treating appliance may be operated in an effective and efficient manner. The above described embodiments may be used to control acceleration of the drum through critical natural frequencies of the laundry treating appliance with the plurality of balls in the balance ring in a location that promotes less movement of the tub and laundry treating appliance. The ability to control such operation may be very beneficial to improving the laundering performance as the laundry treating appliance may be controlled in real time to minimize the impact of the imbalanced load.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of operating a laundry treating appliance having a rotatable drum at least partially defining a treating chamber for receiving a laundry load for treatment according to an automatic cycle of operation and a ball balance ring mounted to a rotatable drum and defining an internal raceway in which a plurality of balls are located, the method comprising:
   rotating the drum at or above a satellizing speed;
   determining when the plurality of balls is angularly aligned with an imbalance of laundry in the drum during the rotation of the drum based on a peak torque of a motor rotating the drum;
   determining when in the future the plurality of balls will be angularly opposite the imbalance of laundry in the rotatable drum based on the determination of angular alignment of the plurality of balls and the imbalance; and
   accelerating a rotational speed of the drum through a natural frequency of the laundry treating appliance when the plurality of balls is determined to be angularly opposite the imbalance of laundry in the rotatable drum.

2. The method of claim 1 wherein the determining when the plurality of balls will be angularly opposite the imbalance of laundry in the rotatable drum comprises determining a number n of drum rotations until the plurality of balls will be angularly opposite the imbalance of laundry in the rotatable drum based on the peak torque.

3. The method of claim 1 wherein the accelerating the drum comprises selecting a ramp rate and initiating the acceleration such that the drum speed is about equal to the natural frequency of the laundry treating appliance when the plurality of balls are predicted to be opposite the imbalance of laundry.

4. The method of claim 1 wherein the determining when the plurality of balls will be angularly opposite the imbalance of laundry in the rotatable drum is further based on a viscosity of a fluid in the ball balance ring.

5. The method of claim 4, further comprising determining the viscosity of the fluid in the balance ring based on a temperature of the fluid in the balance ring.

6. The method of claim 5 wherein the temperature of the fluid in the balance ring is estimated based on a temperature within the drum.

7. The method of claim 6, further comprising sensing the temperature within the drum.

8. The method of claim 1 wherein the determining when the plurality of balls will be angularly opposite the imbalance of laundry in the rotatable drum comprises determining a movement of the laundry treating appliance.

9. The method of claim 8 wherein the movement of the laundry treating appliance is a translational movement in at least one of the X, Y, and Z axes.

10. The method of claim 1 wherein the determining when the plurality of balls will be angularly opposite the imbalance of laundry in the rotatable drum is based on a size of the ball balance ring.

11. The method of claim 1 wherein the determining when the plurality of balls will be angularly opposite the imbalance of laundry in the rotatable drum includes determining a size of the imbalance of the laundry.

12. The method of claim 1 wherein the determining when the plurality of balls will be angularly opposite the imbalance of laundry in the rotatable drum includes determining a size of a distributed mass of laundry in the rotatable drum.

13. The method of claim 1 wherein the plurality of balls is estimated to be angularly opposite the imbalance of laundry when the plurality of balls is 180 degrees from the imbalance of laundry.

14. The method of claim 13 wherein the accelerating the drum comprises beginning to increase a speed of rotation of the drum when the plurality of balls is in a determined phase angle from the laundry imbalance.

15. The method of claim 1 wherein the determining that the plurality of balls is angularly opposite with the imbalance of laundry in the rotatable drum comprises utilizing a sensor to determine a movement of the laundry treating appliance.

16. The method of claim 1 wherein the determining when in the future the plurality of balls will be angularly opposite the imbalance of laundry in the rotatable drum comprises estimating when in the future the plurality of balls will be angularly opposite the imbalance of laundry in the rotatable drum.

17. The method of claim 1 wherein the determining when the plurality of balls will be angularly opposite the imbalance of laundry in the rotatable drum is based on an indicator of age of the laundry treating appliance.

18. The method of claim 1 wherein the determining when the plurality of balls will be angularly opposite the imbalance of laundry in the rotatable drum comprises determining a number n of drum rotations until the plurality of balls will be angularly opposite the imbalance of laundry in the rotatable drum.

19. A method of operating a laundry treating appliance having a rotatable drum at least partially defining a treating chamber for receiving a laundry load for treatment according to an automatic cycle of operation and a ball balance ring mounted to a rotatable drum and defining an internal raceway in which a plurality of balls are located, the method comprising:
   rotating the drum at or above a satellizing speed;
   determining when the plurality of balls is angularly aligned with an imbalance of laundry in the drum during the rotation of the drum based on a peak torque of a motor rotating the drum;
   predicting when in the future the plurality of balls will be angularly opposite the imbalance of laundry in the rotatable drum based on the determining when the plurality of balls is angularly aligned with an imbalance of laundry in the drum during the rotation of the drum; and
   accelerating a rotational speed of the drum through a natural frequency of the laundry treating appliance, where the natural frequency correlates to a predetermined range of revolutions per minute of the drum, when the plurality of balls is determined to be angularly opposite the imbalance of laundry in the rotatable drum.

20. The method of claim 19 wherein the accelerating comprises a controller selecting a ramp rate and initiating the acceleration such that the drum speed is about equal to the natural frequency of the laundry treating appliance when the plurality of balls are predicted to be opposite the imbalance.

* * * * *